(12) United States Patent
Spencer et al.

(10) Patent No.: US 7,473,000 B2
(45) Date of Patent: Jan. 6, 2009

(54) SHIELD FOR SOLAR RADIATION COLLECTOR

(75) Inventors: Mark Spencer, San Jose, CA (US); Stephen J. Horne, El Granada, CA (US)

(73) Assignee: Solfocus, Inc., Mountain View, CA (US)

( * ) Notice: Subject to any disclaimer, the term of this patent is extended or adjusted under 35 U.S.C. 154(b) by 42 days.

(21) Appl. No.: 11/635,292

(22) Filed: Dec. 7, 2006

(65) Prior Publication Data

US 2008/0137205 A1     Jun. 12, 2008

(51) Int. Cl.
  *G02B 27/00* (2006.01)
(52) U.S. Cl. .................... 359/613; 359/601; 359/614
(58) Field of Classification Search ................ 359/601, 359/613, 614
See application file for complete search history.

(56) References Cited

U.S. PATENT DOCUMENTS

| | | | | |
|---|---|---|---|---|
| 4,242,580 A | * | 12/1980 | Kaplow et al. | 250/203.4 |
| 4,313,024 A | * | 1/1982 | Horne | 136/253 |
| 4,746,370 A | * | 5/1988 | Woolf | 136/246 |
| 5,062,899 A | * | 11/1991 | Kruer | 136/259 |
| 2005/0046977 A1 | * | 3/2005 | Shifman | 359/853 |
| 2006/0266408 A1 | | 11/2006 | Horne et al. | |
| 2006/0274439 A1 | | 12/2006 | Gorden et al. | |

OTHER PUBLICATIONS

Feuermann, Daniel et al., "Realization of high-flux, compact, passively cooled commercial photovoltaic prototypes", International Solar Concentrator Conference for the Generation of Electricity or Hydrogen, Scottsdale, AZ, May 1-4, 2005. 4pgs.

* cited by examiner

*Primary Examiner*—Joshua L Pritchett
(74) *Attorney, Agent, or Firm*—Buckley, Maschoff & Talwalkar LLC

(57) ABSTRACT

A solar concentrator may include a substantially planar surface, a curved primary mirror having a first perimeter, at least a portion of the first perimeter being in contact with the substantially planar surface, a secondary mirror disposed between the substantially planar surface and the curved primary mirror, the secondary mirror associated with a desired focal area, and a shield element disposed between the substantially planar surface and the curved primary mirror. The shield element is to prevent a portion of light reflected by the secondary mirror from reaching the primary mirror. In some aspects, a portion of the shield element may be disposed between the substantially planar surface and a plane which is substantially parallel to the substantially planar surface and which includes a portion of the desired focal area. The shield element may include a reflective surface to reflect light received from the secondary mirror toward the desired focal area.

20 Claims, 8 Drawing Sheets

SHIELD FOR SOLAR RADIATION COLLECTOR

BACKGROUND

1. Field

Some embodiments generally relate to the collection and concentration of solar radiation. More specifically, embodiments may relate to systems to improve the durability and/or efficiency of solar radiation collectors.

2. Brief Description

A concentrating solar radiation collector may receive solar radiation (i.e., sunlight) over a first surface area and direct the received radiation to a second, smaller, surface area. Accordingly, the intensity of the solar radiation within the second area is greater than the intensity within the first area. Existing power systems may leverage this increased intensity to generate electricity in any number of ways.

For example, a conventional parabolic trough concentrator consists of a long trough-shaped mirror and a liquid-filled pipe located between the mirror and the sun. In operation, the mirror reflects and concentrates received solar radiation onto the liquid-filled pipe. The concentrated solar radiation heats the liquid, which may then be used to drive heat-powered electrical generators (e.g., steam turbines).

Co-pending U.S. patent application Ser. No. 11/138,666, entitled "Concentrator Solar Photovoltaic Array with Compact Tailored Imaging Power Units", describes several types of solar power units utilizing unique collector configurations. FIG. 1A is a cross-sectional view of one example of the power units described therein. Power unit 10 includes primary mirror 11, secondary mirror 12, protective surface 13, housing 14, optical element 15 and photovoltaic cell 16.

FIG. 1A depicts "on-axis" operation of power unit 10, in which incoming radiation 20 is substantially normal to surface 13. As illustrated, radiation 20 passes through surface 13 and is received by primary mirror 11. Primary mirror 11 reflects received radiation 20 toward secondary mirror 12, which in turn reflects radiation 20 toward a desired focal area f. Focal area f may comprise a point or larger area on and/or within optical element 15. In this regard, optical element 15 comprises a tapered optical rod which directs concentrated radiation 20 received at focal area f to cell 16. Cell 16 then converts concentrated radiation 20 to electricity using known techniques.

In one variation of power unit 10, focal area f and an entry surface of optical element 15 are positioned closer to secondary mirror 12 than as illustrated in FIG. 1A. Secondary mirror may be substantially flat in other variations.

FIG. 1B depicts "off-axis" operation of power unit 10, in which incoming radiation 30 is not substantially normal to surface 13. According to some examples, power unit 10 exhibits off-axis operation in a case that incoming radiation 30 is more than 2° from normal to surface 13. As described above, radiation 30 passes through surface 13, is received by primary mirror 11, and is reflected by primary mirror 11 toward secondary mirror 12. However, due to the off-axis operation and the underlying geometric relationships of the elements of power unit 10, secondary mirror 12 reflects received radiation 30 toward an area of primary mirror 11 rather than to desired focal area f.

Exposure to concentrated radiation as illustrated in FIG. 1B may crack, deform or otherwise damage primary mirror 11. Such damage may reduce an efficiency and/or operational lifetime of power unit 10. To address this phenomenon, elements of concentrator 10 may be redesigned to reduce the ratio at which received radiation is concentrated. Unfortunately, such a redesign would also reduce the concentration ratio during on-axis operation, thereby reducing a maximum electrical output of power unit 10.

SUMMARY

To address at least the foregoing, some embodiments provide a system and/or apparatus including a substantially planar surface, a curved primary mirror having a first perimeter, at least a portion of the first perimeter being in contact with the substantially planar surface, a secondary mirror disposed between the substantially planar surface and the curved primary mirror, the secondary mirror associated with a desired focal area, and a shield element disposed between the substantially planar surface and the curved primary mirror. The shield element may prevent a portion of light reflected by the secondary mirror from reaching the primary mirror.

The shield element may prevent a portion of the portion of light reflected by the secondary mirror from reaching the primary mirror in a case that light entering the substantially planar surface is not substantially normal to the substantially planar surface. In some aspects, a portion of the shield element is disposed between the substantially planar surface and a plane substantially parallel to the substantially planar surface and including a portion of the desired focal area. A distance from a portion of the shield element to the secondary mirror may be less than a distance from the focal area to the secondary mirror.

Some aspects provide a shield element having a reflective surface facing the secondary mirror. The reflective surface may reflect a portion of the light received from the secondary mirror toward the desired focal area. The reflective surface of the shield element may comprise a lateral surface of a truncated right circular cone.

According to some aspects, light is passed through a substantially planar surface, a portion of the passed light is received at a curved primary mirror having a first perimeter, at least a portion of the first perimeter being in contact with the substantially planar surface. A portion of the received light is reflected with the curved primary mirror toward a secondary mirror disposed between the substantially planar surface and the curved primary mirror, and a portion of the reflected light is reflected toward a desired focal area with the secondary mirror. A portion of the light reflected by the secondary mirror may be prevented from reaching the primary mirror using a shield element disposed between the substantially planar surface and the curved primary mirror.

The portion of the light may be prevented from reaching the primary mirror in a case that the light passed through the substantially planar surface is not substantially normal to the substantially planar surface. In some aspects, a portion of the portion of the light reflected by the secondary mirror is reflected toward the desired focal area using a reflective surface of the shield element. The reflective surface of the shield element may comprise a lateral surface of a truncated right circular cone.

The claims are not limited to the disclosed embodiments, however, as those in the art can readily adapt the description herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts.

DETAILED DESCRIPTION

The following description is provided to enable any person in the art to make and use the described embodiments and sets forth the best mode contemplated by for carrying out some embodiments. Various modifications, however, will remain readily apparent to those in the art.

Figure 1A:
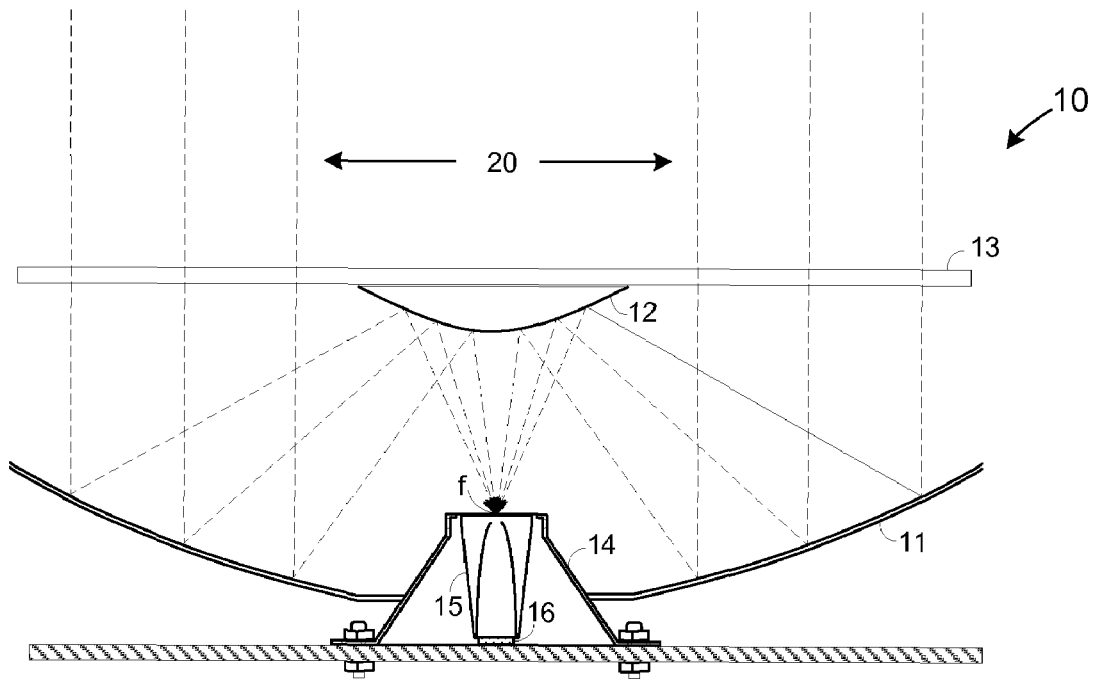
FIGS. 1A and 1B are cross-sectional diagrams illustrating on-axis and off-axis operation, respectively, of a previously-described power unit.
Figure 1B:
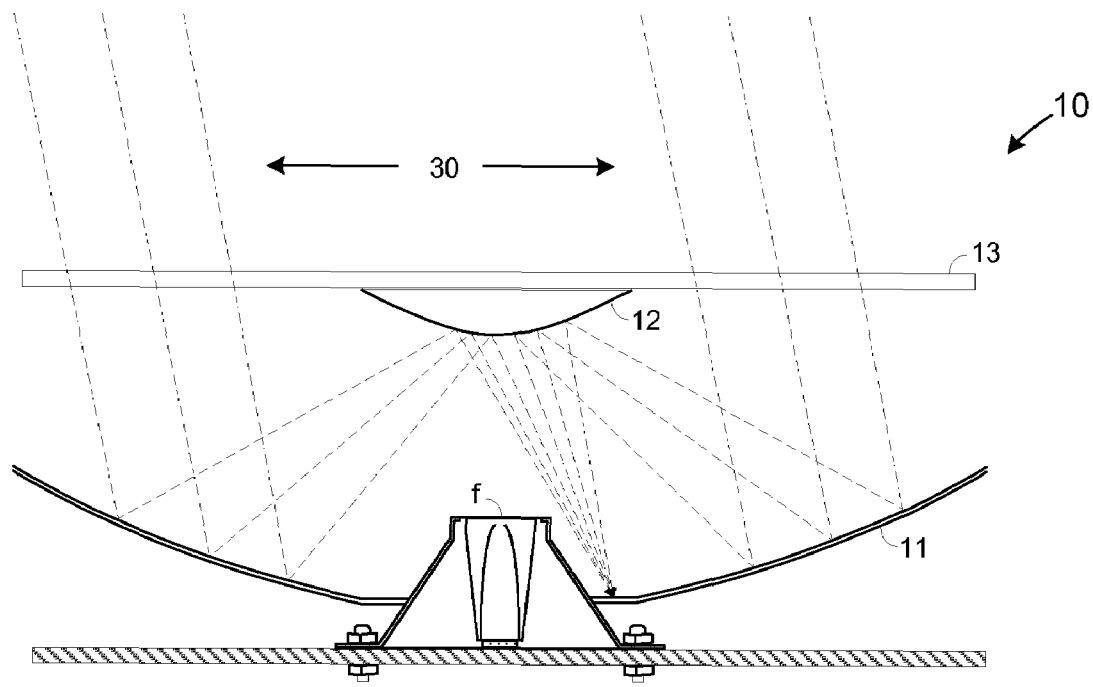
Figure 2:
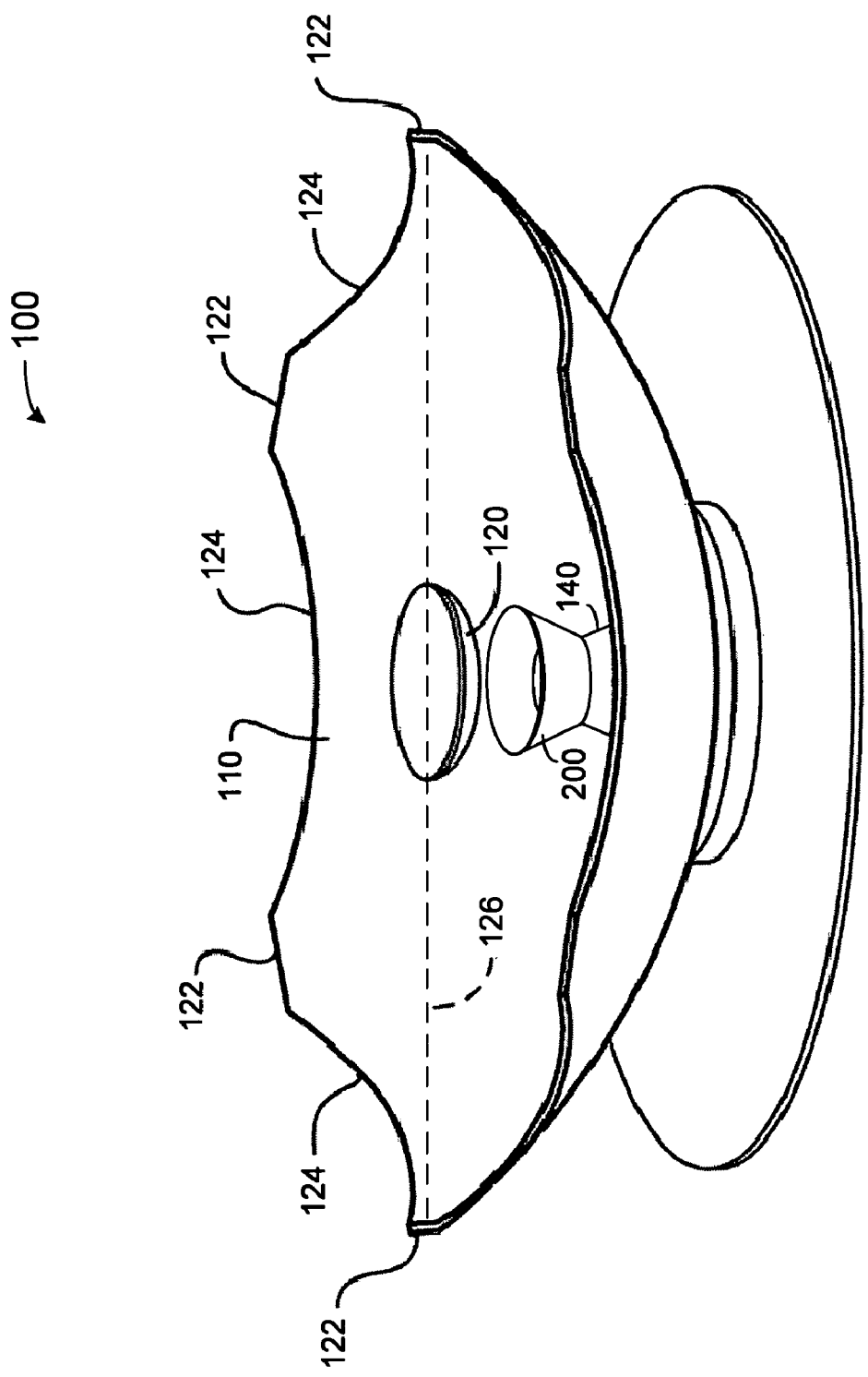
FIG. 2 is a perspective view of a power unit according to some embodiments.

FIG. 2 is a perspective view of power unit 100 according to some embodiments. Power unit 100 includes primary mirror 110, secondary mirror 120, optics housing 140 and shield element 200. Primary mirror 110 and secondary mirror 120 may be physically coupled to a protective front surface, such as a substantially planar window or cover glazing, a representation of which has been omitted from FIG. 2 for clarity. According to some embodiments, shield element 200 is to prevent light reflected by secondary mirror 120 from reaching primary mirror 110 in a case that light entering the front surface is not normal to the front surface.

As described in aforementioned application Ser. No. 11/138,666, the contents of which are hereby incorporated by reference as if set forth herein in full for all purposes, a perimeter of primary mirror 110 is substantially hexagonal. In particular, the perimeter of primary mirror 110 is defined by six full sections 122 and six truncated sections 124 defining generally arched segments. Full sections 122 are substantially coplanar with one another such that they may be provided in contact with and/or adhered to the inner surface of the above-mentioned protective surface. The diameter 126 of primary mirror 110 is approximately 280 mm and the depth is 70 mm in some embodiments.

Primary mirror 110 may comprise a second surface mirror using silver, and may be slump-formed from low iron soda-lime or borosilicate glass. The reflective coating of mirror 110 may be selected to provide a desired spectral response to the wavelengths of solar radiation to be collected, concentrated and converted to electricity by power unit 100. In this regard, any other suitable shapes, sizes and/or compositions of primary mirror 110 may be employed in some embodiments, including but not limited to near-circular and near-square configurations.

Secondary mirror 120 may comprise a first surface mirror approximately 50 mm in diameter. Secondary mirror 120 may comprise silver and a passivation layer formed on a substrate of soda-lime glass. A perimeter of secondary mirror 120 may define any suitable area and/or shape. In some embodiments, mirror 120 is substantially flat.

Secondary mirror 120 may be physically coupled to the protective surface to which full sections 122 are also coupled. Secondary mirror 120 may be directly attached thereto or attached to an interposer (e.g., a 2 mm thick flat glass portion) that is in turn attached to the surface by compression, welding, or an adhesive bonding. Use of an interposer may facilitate secure coupling of secondary mirror 120 to the protective surface.

Shield element 200 is attached to or, in some embodiments, integral with, optics housing 140. As will be illustrated below, shield element 200 may be disposed between primary mirror 110 and a substantially planar surface to which primary mirror 110 is attached. In some embodiments, shield element 200 is to prevent light reflected by secondary mirror 120 from reaching primary mirror 110.

Figure 3:
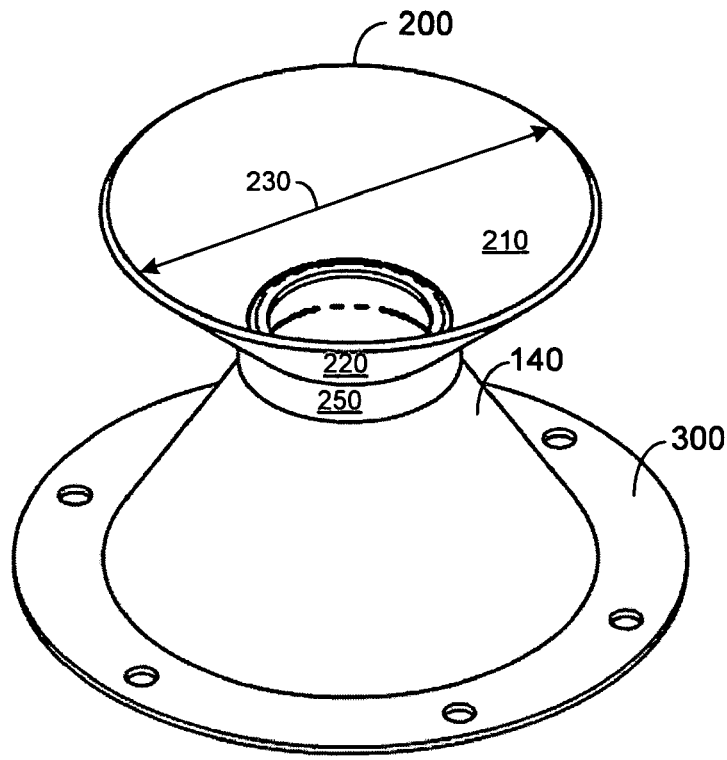
FIG. 3 is a perspective view of a shield element and an optics housing according to some embodiments.
Figure 4:
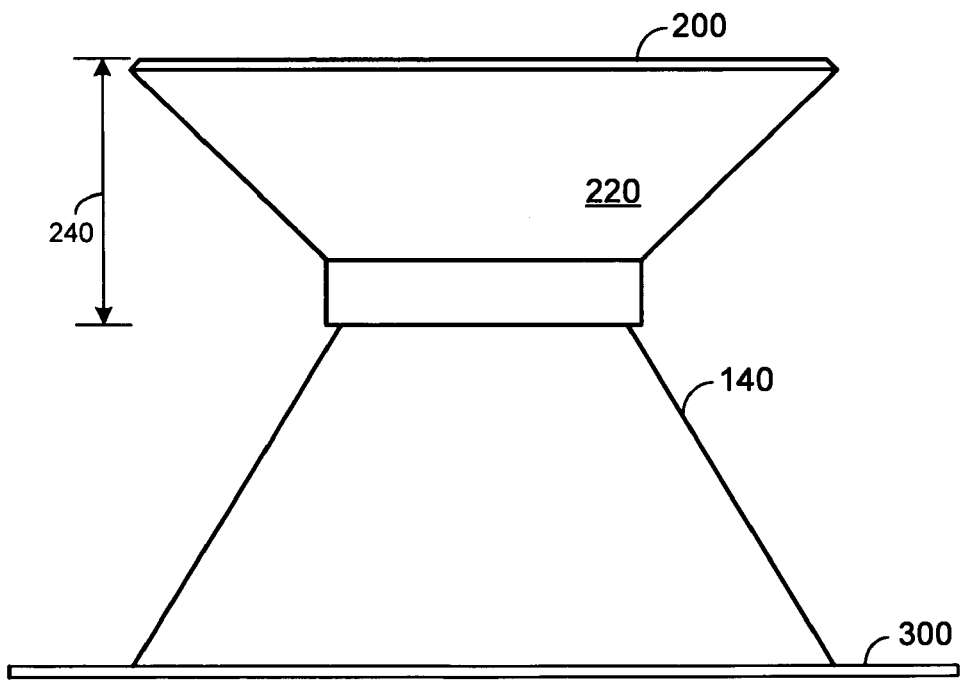
FIG. 4 is a side view of a shield element and an optics housing according to some embodiments.

FIGS. 3 and 4 comprise perspective and side views, respectively, of shield element 200 and optics housing 140 according to some embodiments. According to the illustrated embodiment, inner surface 210 of shield element 200 comprises a lateral surface of a truncated right circular cone, and outer surface 220 comprises a lateral surface of a second truncated right circular cone. In some embodiments, diameter 230 and height 240 of shield element 200 are 50 mm and 25 mm, respectively. Any suitable shapes and dimensions of shield element 200 may be utilized.

Shield element 200 may be composed of any substances that are or become known. The composition of shield element 200 may be selected to prevent transmission concentrated solar radiation received from secondary mirror 120 to primary mirror 110. Shield element 200 may also be designed to withstand and to adequately dissipate heat generated by the received concentrated solar radiation. In some embodiments, shield element 200 comprises aluminum.

Collar 250 of shield element 200 is coupled to a corresponding mating surface of optics housing 140. Collar 250 may be tack-welded or otherwise bonded to the mating surface of optics housing 140. As mentioned above, optics housing 140 houses an optical element for receiving concentrated radiation and a photovoltaic cell (not shown) to which the optical element directs the concentrated radiation. Optics housing 140 also includes base 300 for securing housing 140 (and shield element 200) to a mounting surface.

Figure 5A:
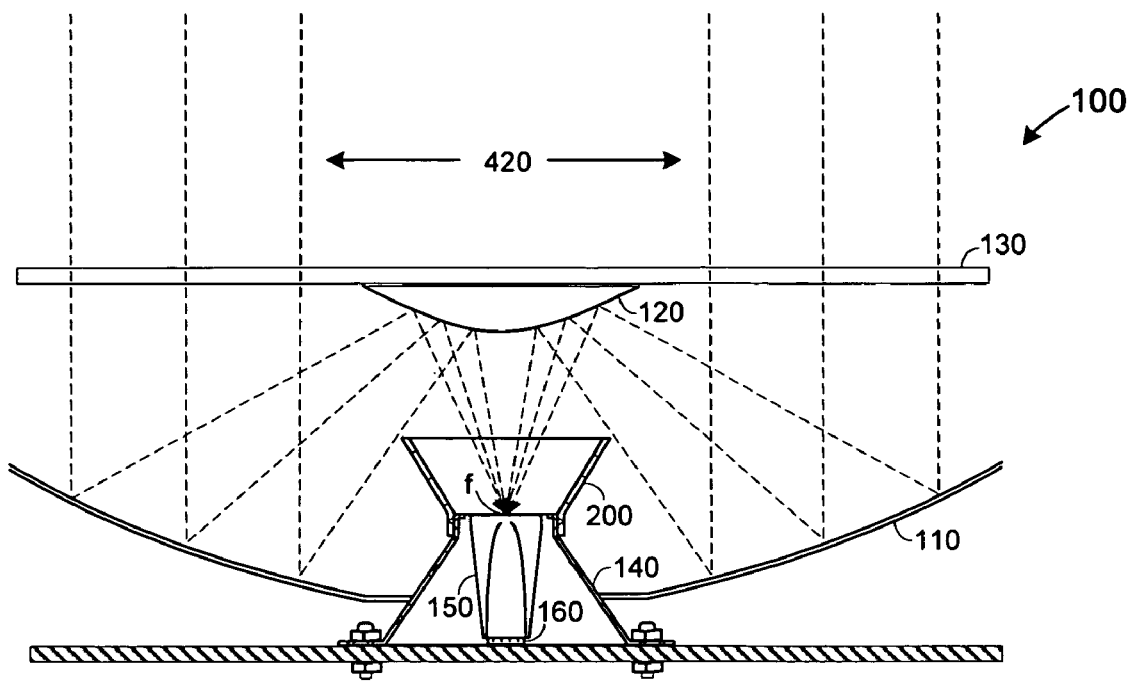
FIG. 5A is a cross-sectional diagram illustrating on-axis operation of a power unit according to some embodiments.

FIG. 5A is a cross-sectional view of power unit 100 according to some embodiments. FIG. 5A shows primary mirror 110, secondary mirror 120, protective surface 130, optics housing 140, optical element 150, photovoltaic cell 160 and shield element 200. As shown, at least a portion of shield element 200 is disposed between secondary mirror 120 and desired focal area f. In other words, and in some embodiments, a distance $d_1$ from a portion of shield element 200 to secondary mirror 120 is less than a distance $d_2$ from desired focal area f to secondary mirror 120. Also (or alternatively depending on the embodiment), a portion of shield element 200 is disposed between surface 130 and plane 170 that is substantially parallel to surface 130 and that includes a portion of desired focal area f.

FIG. 5A depicts on-axis operation of power unit 100. Specifically, incoming radiation 420 is substantially normal to substantially planar surface 130. Some embodiments exhibit on-axis operation if incoming radiation 420 is within 2° of normal to surface 130. Radiation 420 passes through surface 130 and is received by primary mirror 110. Primary mirror 110 reflects received radiation 420 toward secondary mirror 120, where it is further reflected toward desired focal area f. Optical element 150 may be tapered in some embodiments away from focal area f and may employ total internal reflectance to provide optimal transmission of the received radiation towards cell 160.

Figure 5B:
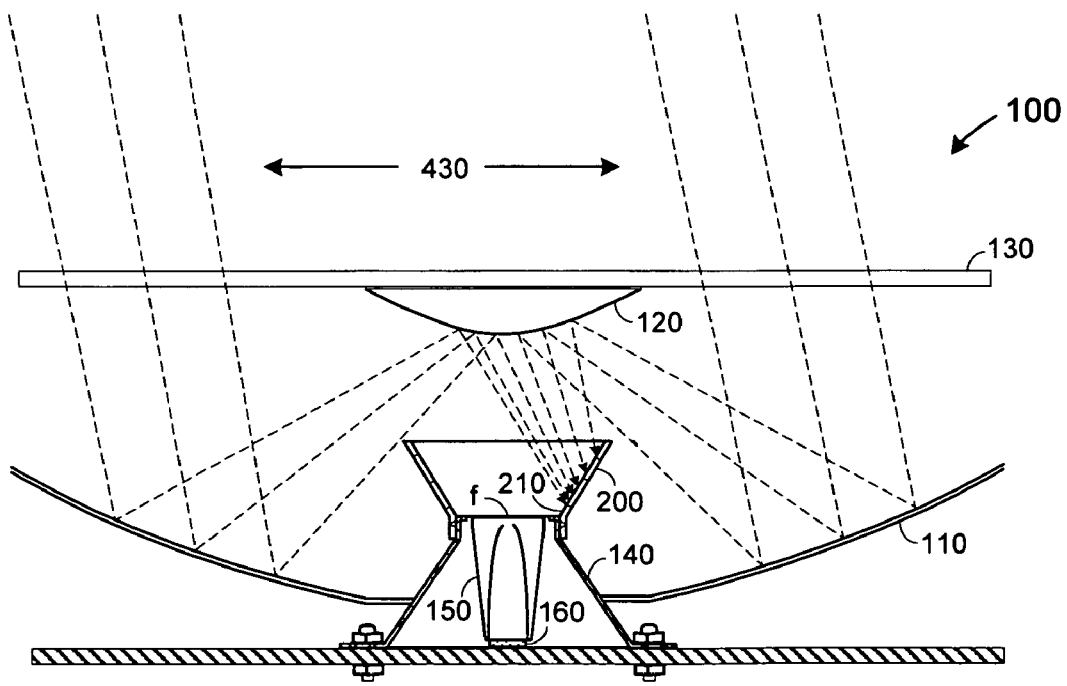
FIG. 5B is a cross-sectional diagram illustrating off-axis operation of a power unit according to some embodiments.

FIG. 5B depicts off-axis operation of power unit 100 according to some embodiments. Power unit 100 may exhibit off-axis operation if incoming radiation 430 is not substantially normal (e.g., more than 2° from normal) to surface 130. Radiation 430 is shown passing through surface 130, being received by primary mirror 110, and being reflected by primary mirror 110 toward secondary mirror 120.

Due to the trajectory of incoming radiation 430, secondary mirror 120 does not reflect the received radiation toward desired focal area f. The radiation is instead reflected toward an area of primary mirror 110. However, as shown in FIG. 5B, the thusly-reflected radiation intercepts inner surface 210 of shield element 200 before it can reach primary mirror 110. Accordingly, shield element 200 may prevent light reflected by secondary mirror 120 from reaching primary mirror 110 in a case that light entering surface 130 is not substantially normal to surface 130.

In some embodiments, shield element 200 includes a reflective surface facing secondary mirror 120. The reflective surface is intended to reflect light received from secondary mirror 120 toward desired focal area f. Such operation may increase a range of angles to incoming radiation at which power unit 100 generates electrical power. For example, inner surface 210 may be plated or otherwise coated with a reflective material (e.g., silver). The reflective surface of shield element 200 may therefore comprise a lateral surface of a truncated right circular cone.

Figure 5C:
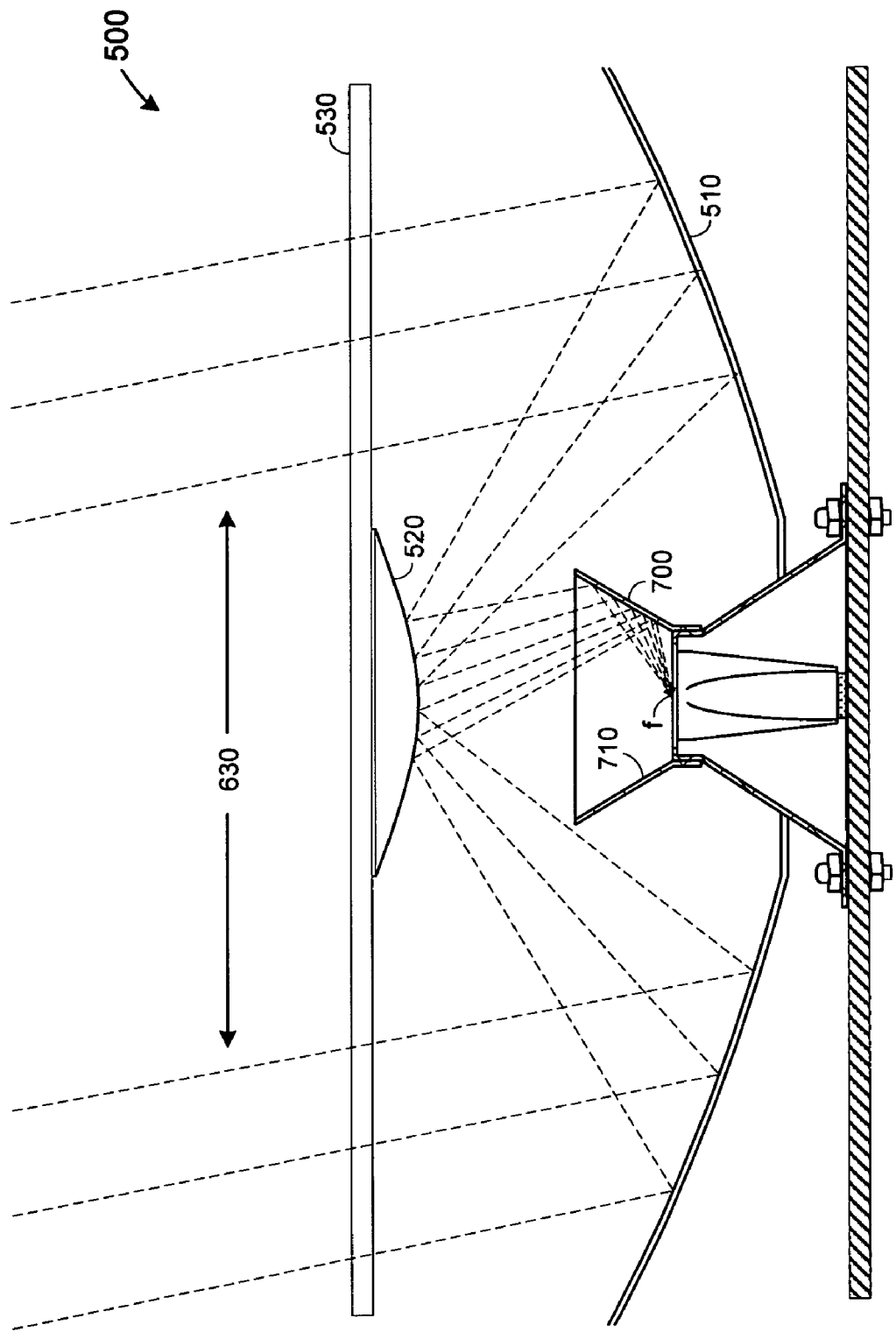
FIG. 5C is a cross-sectional diagram illustrating off-axis operation of a power unit according to some embodiments.

FIG. 5C illustrates operation of power unit 500 according to such an embodiment. Incoming radiation 630 is not substantially normal to surface 530, resulting in off-axis operation of power unit 500. Incoming radiation 630 is therefore reflected by primary mirror 510 and secondary mirror 520 as described above with respect to FIG. 5B.

Reflective surface 710 of shield element 700 receives the radiation from secondary mirror 520 and reflects the received radiation toward focal area f. Embodiments may reflect all or a portion of the received radiation toward focal area f. A degree to which radiation is reflected toward focal area f may depend on an angle of incoming radiation 630 with respect to surface 530 as well as on a shape and location of surface 610.

Figure 6:
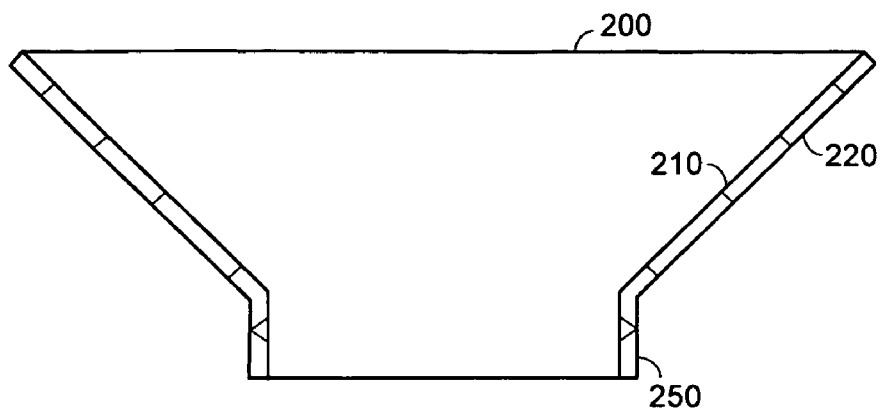
FIG. 6 is a cross-sectional view of a shield element according to some embodiments.

FIGS. 6 through 9 present further details of shield element 200 and optics housing 140 according to some embodiments. FIG. 6 is a cross-sectional view of shield element 200 showing inner surface 210, outer surface 220 and collar 250. As mentioned above, inner surface 210 and/or outer surface 220 may comprise lateral surfaces of respective truncated right circular cones, and inner surface 210 may be reflective. Collar 250 comprises a ring integral with the remaining elements of shield element 200.

Figure 7:
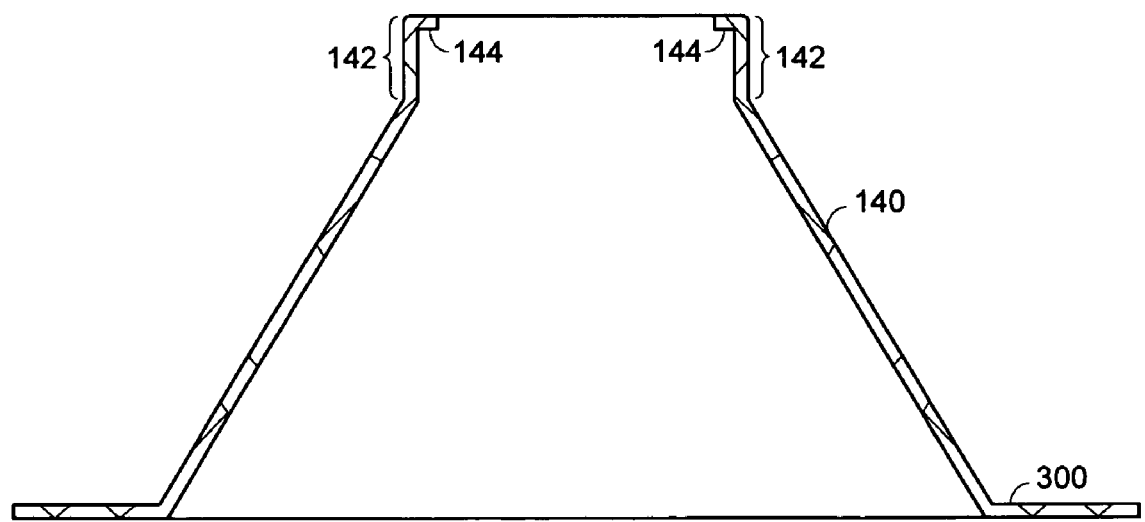
FIG. 7 is a cross-sectional view of an optics housing according to some embodiments.

Collar 250 may slip over mating surfaces 142 of FIG. 7 and may be secured thereto using tack welds or any other suitable bonding method. Optics housing 140 of FIG. 7 is provided with lip 144 to increase the structural integrity of its coupling with shield element 200. Shield element 200 and optics housing 140 may consist of a single integral unit or may be separate from one another according to some embodiments. A unit consisting of element 200 and housing 140 may be secured to a support by securing base 300 to the support.

Figure 8:
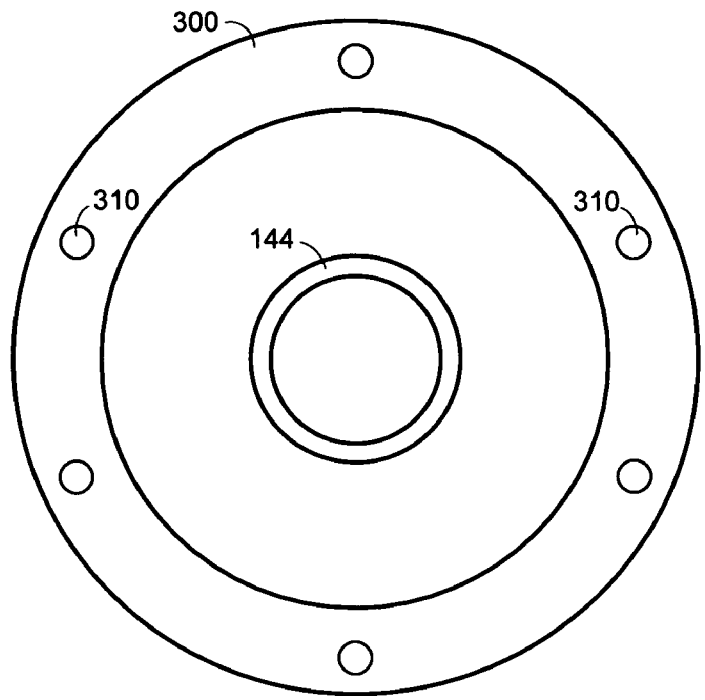
FIG. 8 is a bottom view of an optics housing according to some embodiments.
Figure 9:
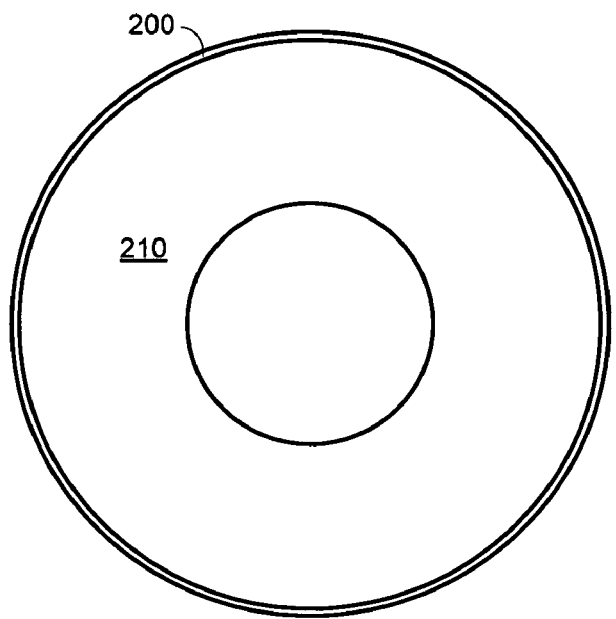
FIG. 9 is a top view of a shield element according to some embodiments.

FIG. 8 is a bottom view of base 300 according to some embodiments. Fastener holes 310 are provided for securing base 310 to a support as described above. Also shown is a bottom view of lip 144. FIG. 9 is a top view of shield element 200. Inner surface 210 may comprise a reflective surface and/or a lateral surface of a truncated right circular cone according to some embodiments.

Figure 10:
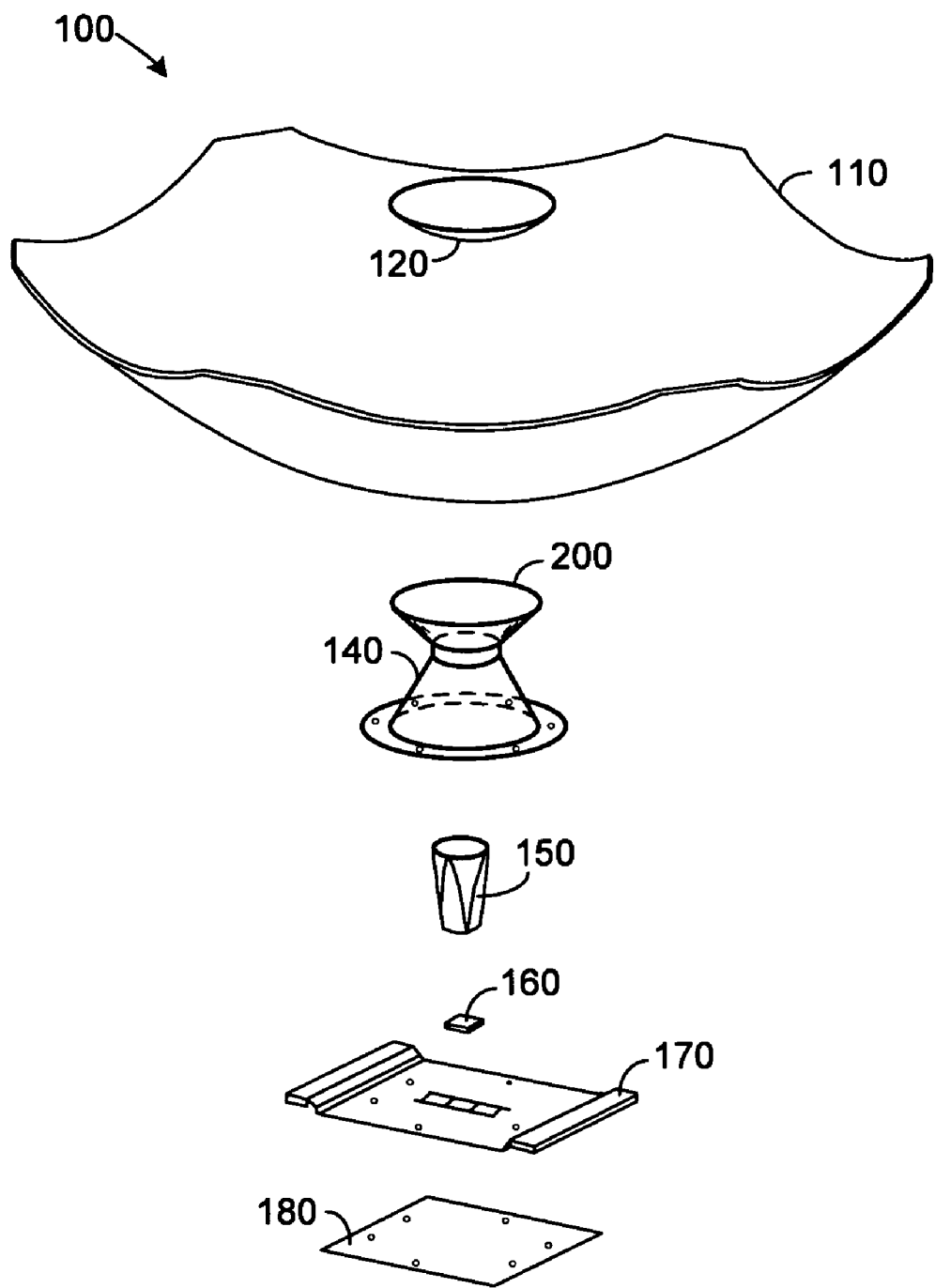
FIG. 10 is an exploded perspective view of an apparatus according to some embodiments.

FIG. 10 is an exploded perspective view of power unit 100 according to some embodiments. FIG. 10 illustrates several elements described above, as well as circuit board 170 and heat spreader 180. Circuit board 170 may provide electrical interconnections between photovoltaic cell 160 and unshown control and/or monitoring elements, and may carry electrical current generated by photovoltaic cell 160. Heat spreader 180 may assist in dispersing heat generated by power unit 100. Such heat may result from concentrated radiation received at focal area f as well as from electrical generation processes of cell 160.

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. An apparatus comprising:
    a substantially planar surface;
    a curved primary mirror having a first perimeter, at least a portion of the first perimeter being in contact with the substantially planar surface;
    a secondary mirror disposed between the substantially planar surface and the curved primary mirror, the secondary mirror associated with a desired focal area located between the curved primary mirror and the secondary mirror; and
    a substantially non-reflecting shield element disposed at least partially between the substantially planar surface and a portion of the desired focal area,
    wherein a portion of the shield element is disposed between the substantially planar surface and a plane which is substantially parallel to the substantially planar surface and which includes a portion of the desired focal area, and
    wherein the portion of shield element is disposed between the secondary mirror and an area of the primary mirror toward which the secondary mirror directs light which is not substantially normal to the substantially planar surface when entering the substantially planar surface.

2. An apparatus according to claim 1,
    wherein a distance from a portion of the shield element to the secondary mirror is less than a distance from the focal area to the secondary mirror.

3. An apparatus according to claim 1,
    wherein the shield element is to prevent a portion of the portion of light reflected by the secondary mirror from reaching the primary mirror in a case that light entering the substantially planar surface is not substantially normal to the substantially planar surface.

4. An apparatus according to claim 1,
    wherein an outer surface of the shield element comprises a lateral surface of a truncated right circular cone.

5. An apparatus according to claim 4,
    wherein an inner surface of the shield element comprises a lateral surface of a second truncated right circular cone.

6. An apparatus according to claim 1, further comprising:
    an optical element to receive light from the secondary mirror and, wherein a portion of the optical element is disposed between the planar surface and is co-located with at least a portion of the desired focal area.

7. An apparatus according to claim 6, further comprising:
a photovoltaic cell toward which the optical element directs the received light.

8. An apparatus according to claim 1,
wherein an inner surface of the shield element comprises a lateral surface of a second truncated right circular cone.

9. An apparatus according to claim 1,
wherein the shield element comprises a metal.

10. An apparatus according to claim 9,
wherein the metal comprises aluminum.

11. A method comprising:
passing light through a substantially planar surface, wherein the light is not substantially normal to the substantially planar surface;
receiving a portion of the passed light at a curved primary mirror having a first perimeter, at least a portion of the first perimeter being in contact with the substantially planar surface;
reflecting, with the curved primary mirror, a portion of the received light toward a secondary mirror disposed between the substantially planar surface and the curved primary mirror;
reflecting, with the secondary mirror, a portion of the reflected light toward a desired focal area located between the curved primary mirror and the secondary mirror; and
preventing a portion of the light reflected by the secondary mirror from reaching the primary mirror using a substantially non-reflecting shield element disposed at least partially between the substantially planar surface and a portion of the desired focal area,
wherein a portion of the shield element is disposed between the substantially planar surface and a plane which is substantially parallel to the substantially planar surface and which includes a portion of the desired focal area, and
wherein the portion of shield element is disposed between the secondary mirror and an area of the primary mirror toward which the secondary mirror directs light which is not substantially normal to the substantially planar surface when entering the substantially planar surface.

12. A method according to claim 11,
wherein a distance from a portion of the shield element to the secondary mirror is less than a distance from the focal area to the secondary mirror.

13. A method according to claim 11,
wherein preventing the portion of the light from reaching the primary mirror comprises:
preventing the portion of the light from reaching the primary mirror in a case that the light passed through the substantially planar surface is not substantially normal to the substantially planar surface.

14. A method according to claim 11,
wherein an outer surface of the shield element comprises a lateral surface of a truncated right circular cone.

15. A method according to claim 14,
wherein an inner surface of the shield element comprises a lateral surface of a second truncated right circular cone.

16. A method according to claim 11, further comprising:
receiving a portion of the light reflected by the secondary mirror at an optical element disposed between the planar surface and the primary mirror,
wherein a portion of the optical element is co-located with at least a portion of the desired focal area.

17. A method according to claim 16, further comprising:
directing a portion of the light received by the optical element toward a photovoltaic cell.

18. A method according to claim 11,
wherein an inner surface of the shield element comprises a lateral surface of a second truncated right circular cone.

19. A method according to claim 11,
wherein the shield element comprises a metal.

20. A method according to claim 19,
wherein the metal comprises aluminum.

* * * * *